US007291233B2

(12) United States Patent
Brigato

(10) Patent No.: US 7,291,233 B2
(45) Date of Patent: Nov. 6, 2007

(54) PROCESS FOR APPLYING A TRANSFERABLE IMAGE ON A WALL

(75) Inventor: Antonio Brigato, Conselve (IT)

(73) Assignee: Graphic Report SNC Di Brigato A. & C., Conselve (IT)

( * ) Notice: Subject to any disclaimer, the term of this patent is extended or adjusted under 35 U.S.C. 154(b) by 0 days.

(21) Appl. No.: 10/813,515

(22) Filed: Mar. 30, 2004

(65) Prior Publication Data

US 2005/0000633 A1 Jan. 6, 2005

Related U.S. Application Data

(63) Continuation-in-part of application No. 09/856,856, filed as application No. PCT/IT99/00389 on Nov. 26, 1999, now abandoned.

(30) Foreign Application Priority Data

Dec. 1, 1998 (IT) .............................. PD98A0282

(51) Int. Cl.
*B32B 37/00* (2006.01)

(52) U.S. Cl. ........................ 156/71; 156/237; 156/241; 156/277

(58) Field of Classification Search ................ 156/230, 156/234, 237, 238, 239, 240, 241, 247, 249, 156/277, 289, 71; 427/146, 147, 148; 430/126
See application file for complete search history.

(56) References Cited

U.S. PATENT DOCUMENTS 5,601,959 A 2/1997 Brault et al.
6,153,038 A * 11/2000 Brooker ...................... 156/230

* cited by examiner

*Primary Examiner*—James Sells
(74) *Attorney, Agent, or Firm*—Browdy and Neimark, PLLC

(57) ABSTRACT

A process for applying a transferable image on a wall includes applying a transferable image onto a first surface of a transfer sheet, applying a sealant coating directly over the transferable image, applying an adhesive binder on the wall, placing the transfer sheet against the wall with the first surface in facing relationship with the adhesive binder on the wall, applying pressure to transfer the transferable image onto the wall, and removing the transfer sheet from the wall. The process protects the transferable image on the wall and controls the appearance of the transferable image for decorative purposes. The process is directly applicable to roughened and irregular surfaces of actual wall structures.

6 Claims, 1 Drawing Sheet

PROCESS FOR APPLYING A TRANSFERABLE IMAGE ON A WALL

RELATED U.S. APPLICATIONS

The present utility patent application claims priority under 35 U.S.C. §120 from Nonprovisional patent application Ser. No. 09/856,856 filed on May 29, 2001 and entitled "PROCESS FOR THE REALIZATION OF TRANSFERABLE IMAGES SPECIALLY FOR WALLS", now abandoned.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This patent relates to the field of decorations and in particular, wall decorations.

BACKGROUND OF THE INVENTION

Generally, the walls of houses, gardens or buildings are usually painted with one or more continuous colors for each wall. In some valuable houses or premises the walls are decorated with simple, complex, monochrome or poly chrome drawings. The simple decorations such as hems, lines, stripes or simple figures are first drawn with a fine pencil line which can be erased or are drawn in the same color as the figure. Then the outlined drawings are filled with the color by means of a brush or a spray gun.

In the case of decorations by brush and always in case of decorations by spray gun, the outlines of the figure to be drawn are circumscribed by stencils so as to prevent the color from smudging and to avoid halves.

As for the more complex decorations, such as stripes with geometric or curvilinear patterns, stencils are used. They are laid on the wall and colored. The paint goes through the shaped holes of the stencil coloring the wall with the exact shape of the stencil.

In order to realize drawings with two or more colors it, is necessary to use one stencil for each color shortly after that the previous one is dried.

This kind of decoration is carried out by professional painters with the help of several stencils owing to the considerable exactness and ability required. In any case, even using the stencils, it is impossible to carry out small decorations or to soften the colors. Softened or small decorations have to be carried out manually by an expert painter or decorator.

Transfers are well known, that is, drawings painted on a sheet of transfer paper. These drawings can be heat-transferred on various kinds of materials by means of presses or calendars, but they can neither be transferred on rough surfaces nor have wide dimensions.

In the past, various U.S. patent have issued in the field of transfers. For example, U.S. Pat. No. 5,601,959, issued on Feb. 11, 1997 to Brant et al., teaches a direct transfer electro graphic imaging element and process. The Brant patent discloses applying a transferable image to a transfer sheet, applying an adhesive coating on the wall and on the transferable image, placing the transfer sheet against the wall, applying heat and/or pressure to press the transfer sheet against the wall to bond and transfer the image to the adhesive layers on the wall, and removing the transfer sheet from the wall.

Importantly, the Brant patent does not disclose a process for use on roughened or irregular surfaces or walls. The process is limited to a permanent receptor that is a rigid or semi-rigid sheeting or plate. A "brick wall" is mentioned in the specification as a type of planar and rigid sheeting, similar to a plate of metal, plastic or glass. Additionally, the Brant patent does not disclose a process for applying a transferable image to an actual wall structure. The process relies upon mobile permanent receptors, such as individual sheets and individual bricks, that receive an image and then are mounted on a structure. In the specification, the image transferring, adhesive coating, and heat and/or pressure application are accomplished through a rolling machine in a horizontal orientation only, and the individual sheets are located away from the final mounting on a structure.

In the context of one skilled in the art, this reference to a "brick wall" and subsequent teachings of the prior art patent fail to disclose types of actual walls as permanent receptors. The Brant patent cannot be used as taught on a concrete wall, wall plaster, ceiling plaster or curved wall structure. Thus, the Brant patent shows a need for a process to be used on textured, roughened and irregular surfaces and for a process enabled for direct application on actual wall structures in horizontal and non-horizontal orientations.

BRIEF SUMMARY OF THE INVENTION

In order to overcome to the above cited drawbacks a new process for decorations has been studied and carried out. The process allows a user to form decorations with drawings, photographic images and processed images realized by computers that can be personalized.

The present invention is a process for applying a transferable image on a wall including applying a transferable image onto a first surface of a transfer sheet, applying a sealant coating directly over the transferable image, applying an adhesive binder on the wall, placing the transfer sheet against the wall with the first surface in facing relationship with the adhesive binder on the wall, applying pressure to transfer the transferable image onto the wall, and removing the transfer sheet from the wall. The process protects the transferable image on the wall by sandwiching between the first surface and the sealant coating. The process allows a user to better control the appearance of the transferable image for decorative purposes on roughened and irregular surfaces of actual wall structures.

DETAILED DESCRIPTION OF THE INVENTION

Figure 1:
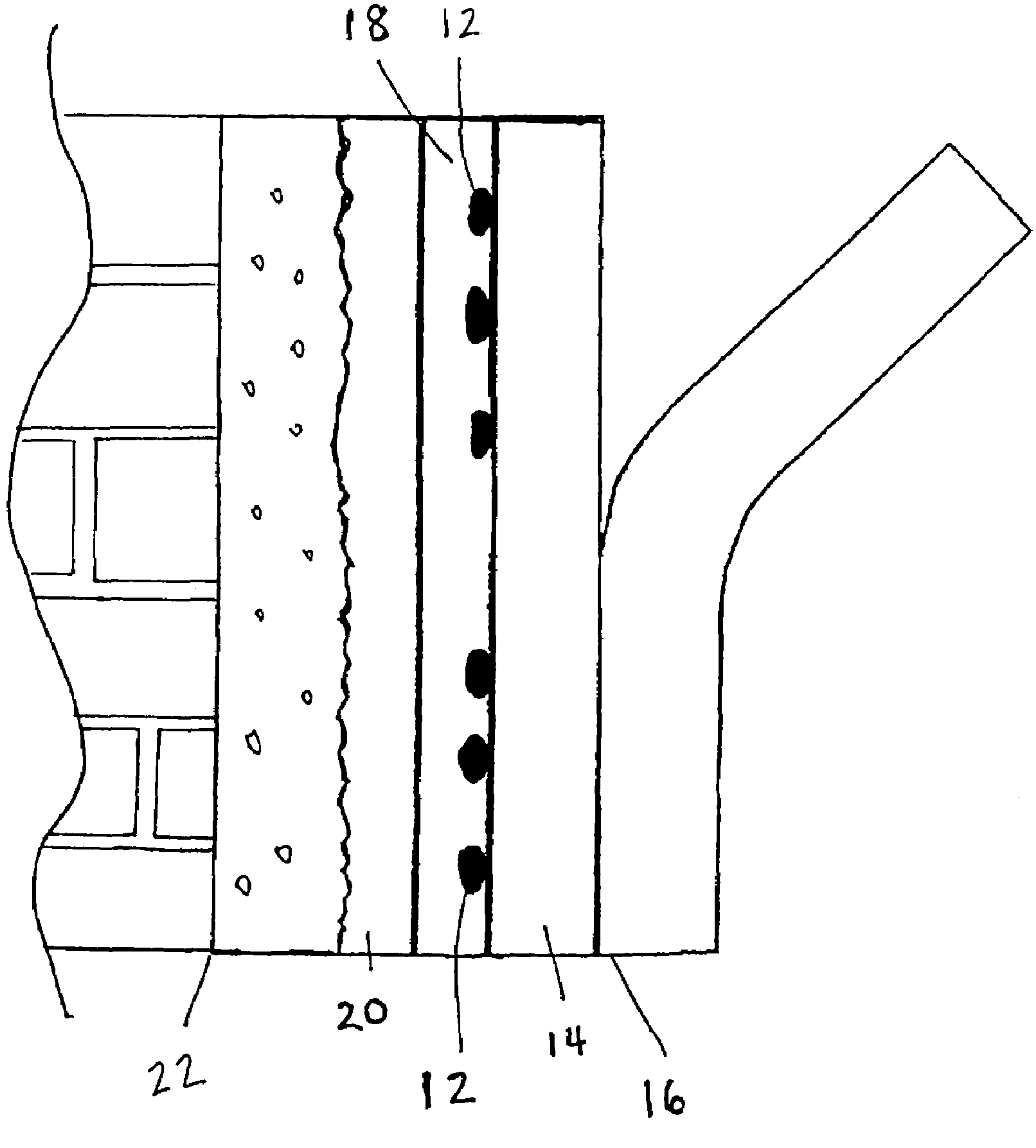
FIG. 1 cross-sectional view of the image, transfer sheet and other elements used in the process of the present invention.

Referring to FIG. 1, the present invention is a process for applying a transferable image on a wall. A transferable image 12 is applied onto a first surface 14 of a transfer sheet 16 by processing the image 12 by a computer and printing the image 12 on the first surface 14. The image 12 or the decoration to be transferred on the wall is drawn by means of a computer. This phase can be performed by scanning an existing image or modifying an existing image or realizing the image required by a computer.

The digital image obtained is then processed, that is, its colors are corrected to balance the various chromatic differences between the monitor and the inks used. The image is reversed in orientation when printing because the back side of the transfer sheet 16 will face outwardly from the wall surface instead of the top of the first surface 14. The image 12 can also be subdivided onto multiple transfer sheets if its dimensions are beyond a single transfer sheet.

The image processed and/or divided can be printed by means of proper electrostatic printer on a roll of transfer sheet paper using four color inks (black, blue, red, yellow). The images are not color printed for each color on separate sheets, as in the case of stencils, but rather all the colors can be printed on the same transfer sheet 16.

Next, a sealant coating 18 is applied directly over the transferable image 12 applied to the transfer sheet 16. The sealant coating 18 can be an adhesive, preferably with polyvinyl alcohol, that is laid over the image 12 and spread on the transfer sheet 16. Such an adhesive can be tacky at room temperature so as to avoid any heating or adhesive activation steps. The sealant coating 18 and the first surface 14 protect the transferable image from any distortion and irregularity when mounted on a roughened or irregular surface. The smoothness of the image 12 is maintained, even if placed on a curved ceiling vault or bumpy wall plaster.

The sealant coating 18 can be non-adhesive when placing the transfer sheet 16 with the sealant coating 18 over the transferable image 12 against the wall with the first surface 14 in a facing relationship with the wall. The sealant coating 18 is typically sprayed onto the transfer sheet 16 to bind the ink of the image 12 to the first surface 14 of the transfer sheet 16. Drying the sealant coating 18 can be an additional step of the present invention which sandwiches the transferable image 12 between the sealant coating 18 and the first surface 14.

The sealant coating 18 can be transparent, translucent or opaque. These properties allow the process of the present invention to better control the appearance of the transferable image for decorative purposes. The sealant coating 18 can be used to adjust the background for the transferable image 12. For example, a user may want to show the image 12 against the actual wall color and use a transparent sealant coating 18, or the user may want to show the image 12 against an evenly colored background and use an opaque sealant coating 18. Unlike the prior art, the process of the present invention adjusts the wall decoration according to the roughened and possible color irregularity of actual wall structures.

The present invention is a process using a sealant coating 18, which can have adhesive properties at ambient temperature. Unlike the prior art, the sealant coating 18 is not restricted by the other temperature-activated adhesives on the transfer sheet 16 or on the wall 22. In the present invention, the sealant coating 18 may be tacky at room temperature, regardless of the active adhesive properties of the other adhesives. Additionally, the sealant coating 18 can be dried before contacting the wall 22 such that the sealant coating 18 has no adhesive properties at the actual time of contacting the adhesive binder 20 on the wall 22. For example, the sealant coating 18 can be sprayed onto the transferable image 12 to create the protective sandwiching layers. When dried, the transfer sheet 16 and image 12 can be transported easily and with reduced risk of damage to the image 12.

Importantly, the present invention represents significant improvements and increased benefits beyond the prior art. Besides use of the room temperature activation and drying step advantages, the present invention specifically enables the activities of printing of the image 12 and applying to the wall 22 to occur at different locations. The sealant coating 18 on the transfer sheet provides a protection for the ink of the printer to avoid smudging and distortion. Therefore, the transfer sheets 16 can be stacked and easily transported from the computer printing facility. The prior art does not disclose the sealant coating 18 of the present invention.

The next step of the process of the present invention is to apply an adhesive binder 20 on the wall 22. On the surface which the image 12 is to be painted, a thin adhesive binder layer 20 having suitable chemical physical specifications-preferably equal or similar to the which ones of the inks used for the print of the image-is spread on the wall 22. The adhesive binder 20 has chemical and physical specifications compatible with inks such that the colors of the image 12 will not be distorted.

Then, the transfer sheet 16 with the sealant coating 18 over the transferable image 12 is placed against the wall 22 with the first surface 14 in facing relationship with the adhesive binder 20 on the wall 22. In the case of a subdivided image 12, each transfer sheet 16 is placed on the wall 22 in the right position so that the side with the image 12 is tamed towards the wall 22. In FIG. 1, the wall 22 is shown with a plaster layer. The plaster of the wall can have an irregular surface that has previously been difficult for transferring complex images in the prior art. Thus, the process of the present invention is particularly useful in transferring images 12 to a plaster wall. The process can be applied to other plaster coated structures besides walls and other structures with irregular and roughened surfaces.

Next, pressure is applied to urge the first surface 14 of the transfer sheet 16 against the wall 22 to thereby transfer the transferable image 12 onto the wall 22, and finally, the transfer sheet 16 is removed from the wall 22. Plugging or apply pressure is performed on the back of the transfer sheet 16 towards the front thereof. That is, the present invention includes pressing on the transfer sheet 16 in order to get the ink of the image 12 to adhere perfectly to the configuration of the wall 22 and to transfer at the same time as the ink on the wall 22.

When the plugging is complete the transfer sheet 16 is removed, leaving the sealed and protected ink composing the image 12 on the adhesive binder 20 spread on the wall 22 itself.

If the image consists of many subdivided parts, the process can be repeated for the other parts as described. The actual dimensions of the image can be huge as the images with large dimensions are split up in several parts with smaller dimensions that are easier to handle.

Once that all the parts of the image 12 are applied on the wall 22, a transparent varnish is applied to the whole image so as to protect the image from dust and scratches and make the image 12 more luminous.

The process above described offers many advantages as far as time, costs, resolution and dimensions are concerned.

The necessary time is limited to processing the image by computer, printing on a roll of transfer sheets, and applying the sheets on the chosen wall.

The costs for the image are moderate as it is not necessary to have expensive stencils or expensive printing systems.

The resolution obtained is very high as the digital printers can print continuous shading and single-colored dots in the order of some split millimeters, which cannot be obtained by means of a normal typographic process and not even by a manual execution of wall painting.

The new process allows even a person who is not familiar with colors to obtain images with a simple application.

The new process produces complex decorations in a quick simple and easy way from photographic copies, and any simple and/or poly chrome image, even with minute details, processed by computer. All of these complex decorations and images can be performed on actual walls and rough masonry surfaces.

If the decoration has to be removed, it can be easily covered with the same paint used for the wall or with a different one according to the user's preferences.

The above are the basic outlines of the invention, on the basis of which a technician with ordinary skill in the art will be able to provide for more exact specifics of implementation. Therefore, any change which may be necessary upon implementation is to be regarded as completely protected by the present invention.

With reference to the above description the following claims are put forth.

I claim:

1. A process for applying a transferable image onto a partially roughened or irregular surface of a fixed wall of concrete or layer covered with plaster, the process comprising:

applying a transferable image onto a first surface of a transfer sheet by processing said transferable image by computer and printing said transferable image on said first surface with an electrostatic printer;

applying a sealant coating directly over the applied transferable image on the first surface, which sealant coating is able to bind the ink of the image;

drying the sealant coating so as to sandwich the transferable image between the sealant coating and the first surface, whereby after drying, said sealant coating does not have adhesive tackiness or heat or pressure activated adhesiveness;

applying an adhesive binder onto the roughened or irregular surface of the wall;

placing the sealant coating applied transfer sheet against said partially roughened or irregular surface of the wall with said first surface in a facing relationship with said adhesive binder on the wall, the sealant coating in dried form being able to protect the transferable image from any distortion and irregularity when mounted on the roughened or irregular surface of said wall;

applying pressure to press said first surface of the placed transfer sheet against the wall, so as to thereby transfer the transferable image onto the wall; and removing the pressure-applied transfer sheet from the wall.

2. The process of claim 1, further comprising:

applying a coating of varnish over the transferred transferable image on the wall.

3. The process of claim 1, wherein the adhesive binder applied to the wall has chemical and physical specifications which are compatible with inks used to apply the transferable image on the transfer sheet.

4. The process of claim 1, wherein said sealant coating is transparent.

5. The process of claim 1, wherein said sealant coating is translucent.

6. The process of claim 1, wherein said sealant coating is opaque.

* * * * *